Nov. 7, 1961   M. A. LANCUCKI ET AL   3,007,438
NOZZLES
Filed Sept. 10, 1957   2 Sheets-Sheet 2
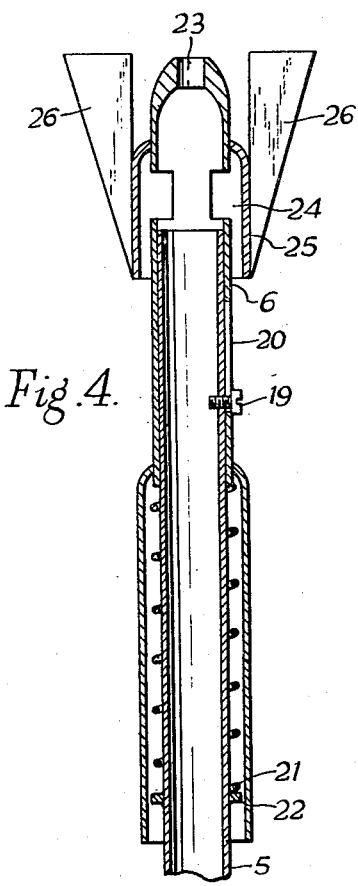
Fig.4.
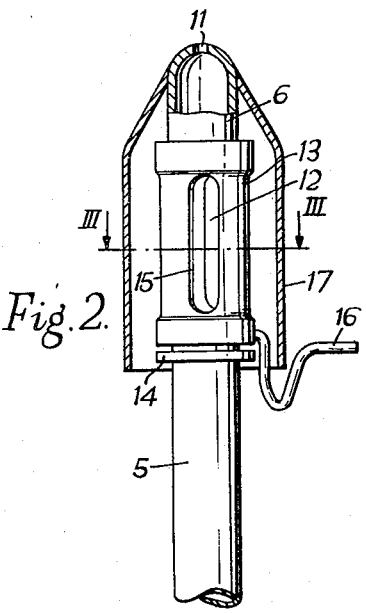
Fig.2.
Fig.3.
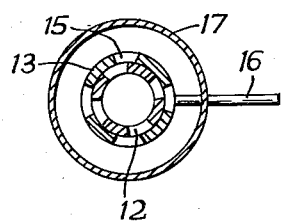
Fig.5.
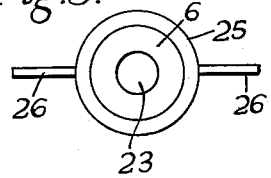
INVENTORS
MARIAN A. LANCUCKI
JOHN W. STRANGE
BY
Joseph C. Ryan
ATTORNEY United States Patent Office 3,007,438
Patented Nov. 7, 1961

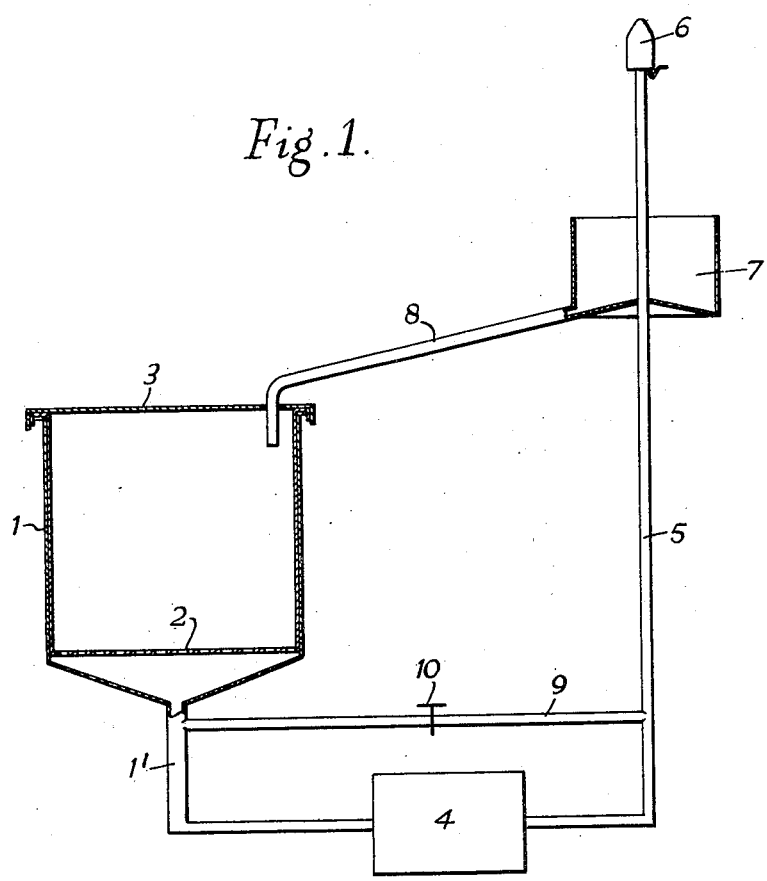

3,007,438
NOZZLES
Marian Aleksander Lancucki and John William Strange, London, England, assignors to Thorn Electrical Industries Limited, London, England
Filed Sept. 10, 1957, Ser. No. 683,137
Claims priority, application Great Britain Sept. 12, 1956
1 Claim. (Cl. 118—3)

This invention is concerned with improvements in and relating to coating apparatus such as is used, for example, in coating the bulbs of lamps.

It is well known to coat the bulbs of incandescent and fluorescent lamps, especially the interior surfaces thereof, with suspensions of light dispersing agents, such as silica, titania and magnesia, and/or with suspensions of colouring agents, such as pigments. In the coating of bulbs on a commercial scale the suspension, or mixture of suspensions, may be sprayed into the bulb interior, the surplus liquid being allowed to drain away and the resulting coating being dried, with the aid of heat if desired. The dried coating may then be baked, i.e. subjected to heat at about 400–650° C.

In one form of coating apparatus that has been used hitherto the coating liquid is contained in a closed chamber from which it is delivered through a filter to a spray nozzle by supplying air under pressure to the interior of the chamber. Delivery of the liquid to the spray nozzle is stopped by stopping the supply of air under pressure and connecting the interior of the chamber to atmosphere to relieve the pressure therein. Excess liquid from the bulb drains to a trough and is able to return to the chamber interior through a non-return valve when the pressure in the chamber interior is relieved.

This apparatus has the disadvantages that there is a delay between the admission of air to the chamber and the supply of liquid from the spray nozzle at the required pressure, and that this delay increases as the volume of liquid in the chamber decreases; additional disadvantages are inefficient stirring and therefore settling of suspension and changes in concentration of the pigment suspension; filtration is intermittent and under pressure; access to the filter is difficult; additional arrangements which are required to remove these drawbacks makes the apparatus too complicated.

An object of the present invention is to provide coating apparatus with which these disadvantages can be avoided and the apparatus thereby made suitable for use in a continuous production system. It is a further object to ensure a continuous circulation of the suspension throughout the apparatus to avoid settling, especially in the chamber containing the suspension.

According to the invention apparatus for coating objects with a liquid comprises a chamber for holding the liquid, said chamber being in communication with the atmosphere, means for supplying liquid continuously from the chamber to a nozzle, means for returning excess liquid from the nozzle to the chamber, and means for controlling the flow of liquid from the nozzle in order to provide a flow suitable for coating when it is required. The flow of liquid from the nozzle for coating purposes may for example be controlled by means of a control valve, such that when the valve is appropriately open the flow of liquid from said liquid supplying means to the nozzle is reduced by the return of some liquid through the pipe. In another arrangement the said flow may be controlled by means of a nozzle having one or more main orifices for the ejection of liquid onto the objects to be coated, one or more subsidiary orifices through which liquid flows to the said excess returning means, and means for controlling the area of the subsidiary orifices. The liquid flow controlling means may be arranged to be operated by the placing of an object to be coated in position over the nozzle.

Apparatus embodying the invention will now be described by way of example, with reference to the accompanying drawings in which:

FIGURE 1 is a semi-diagrammatic view of the lay-out of one form of coating apparatus according to the invention, FIGURES 2 and 3 are views, in sectional elevation and cross-section on the line III—III respectively, of one form of nozzle for use with a modified form of the apparatus shown in FIGURE 1, and FIGURES 4 and 5 are views, in sectional elevation and plan respectively, of another form of nozzle.

The coating apparatus to be described is intended to constitute one station of apparatus for the continuous production of internally coated incandescent light bulbs. The bulbs to be coated with suspension are fed automatically to the coating apparatus and, after coating, are fed automatically to stations at which the coating is dried and baked and the remainder of the operations for completing the bulbs are performed.

Referring to FIG. 1, an open-topped tank 1 for holding the coating suspension is provided near to an outlet at the bottom of the tank with a filter 2, and with a loosely fitting lid 3 allowing communication of the interior of the tank with the atmosphere. A pump 4 continuously supplies filtered liquid from a pipe 1' leading from the bottom of the tank 1 through a vertical pipe 5 to a nozzle 6. A trough 7 surrounds the pipe 5 and is in communication with the top of the tank 1 through a pipe 8 that projects through an opening in the lid 3. A return pipe 9 is connected between the pipes 5 and 1', and in it is provided an on-off valve 10. With the valve 10 open, part of the liquid fed by the pump returns through the pipe 9 to the input end of the pump setting up a closed circulation. The system is preferably so dimensioned, however, e.g. by suitably selecting the flow capacity of the valve 10, that some liquid is always supplied to the nozzle 6 and overflows into the trough 7 whence it is returned to the tank by gravity feed through the pipe 8 to the tank 1. In this way the suspension in the tank 1 is constantly stirred by continuous movement of the liquid drawn from the bottom of the tank 1 and stirring of the top of the liquid by the returning liquid. The loosely-fitting lid 3 on the tank 1 serves to reduce evaporation of the suspension medium and its contamination with dust and dirt but it allows communication with the atmosphere so that air pressure is not built up inside the tank 1. The filter 2 is so disposed that all liquid passing through the outlet at the bottom of the tank 1 must pass through the filter 2.

With a bulb to be coated positioned over the nozzle the valve 10 is closed, whereupon pressure rapidly increases at the nozzle 6 and a jet of coating suspension emerges from the nozzle 6 to impinge on the inner surface of the bulb. The pressure of the jet may be adjusted to that required to coat the entire surface of the bulb by altering the speed of the pump 4 or the extent to which the valve 10 is opened. Excess liquid drains from the bulb into the trough 7 and is returned to the tank 1.

The opening and closing of the valve 10 may be effected automatically by a detector which determines when a bulb is appropriately positioned for receiving the liquid.

In an alternative embodiment of the invention the pressure at the nozzle 6 is controlled by operation of the nozzle itself, and the return pipe 9 and the valve 10 of FIG. 1 are used for adjustment only of the continuous flow of liquid through the nozzle 6. Examples of such a nozzle are shown in FIGURES 2, 3, 4 and 5.

Referring to FIGURES 2 and 3, the nozzle 6 has an orifice 11 in its upper end and longitudinal slits 12 are formed in the side of the nozzle. A sleeve 13, movable angularly about the nozzle 6 and supported on an annular stop 14, is provided with orifices 15 corresponding in number and size to the longitudinal slits in the pipe 5, and with a handle 16 for angularly moving the sleeve 13 to bring the orifices 15 into and out of register with the slits 12. The angular movement of the sleeve 13 may be limited by a fixed stop co-operating with a slit in the sleeve or by two stops limiting the movement of the handle 16. A cylindrical deflector 17 is attached to the end of the pipe 5 and coaxial with it. With the orifices 15 in register with the slits 12 most of the liquid supplied to the nozzle 6 passes out through the slits 12 and orifices 15 and is deflected by the deflector 17 into the trough 7 and returned to the tank 1. If the slits 12 are closed by appropriately rotating the sleeve 13 by means of the handle 16 all the liquid has to discharge through the orifice 11 and it forms a jet suitable for coating a bulb positioned over the nozzle, excess liquid falling from the bulb into the trough 7 and being returned to the tank 1.

The angular movement of the sleeve 13 to cause discharge of a coating jet from the orifice 11 may be effected by the engagement of a bulb to be coated with the handle 16 or an abutment connected thereto, and a spring may be provided for returning the sleeve 13 to the position in which the slits 12 are open when the coated bulb has been removed from the nozzle.

Referring to FIGURES 4 and 5, the nozzle 6 is slidable vertically on the end of the pipe 5, with a limited range of vertical movement controlled by a stop 19 fixed to the pipe 5 and projecting into a slot 20 in the nozzle 6. A compression spring 21 bearing against a ring 22 fixed to the pipe 5 biases the nozzle 6 to its uppermost position in which the stop 19 is at the lower end of the slot 20. The nozzle 6 has an orifice 23 at its upper end, and orifices 24, surrounded by a deflector 25, in its side wall. Contact wings 26 are fitted to the nozzle 6 to facilitate depression of the nozzle into its lowermost position in which the orifices 24 are closed by the pipe 5.

A bulb to be coated is placed in position over the nozzle 6 in contact with the wings 26 and is moved downwards so as to depress the nozzle 6 to its said lowermost position. The consequent closure of the orifices 24 causes liquid to emerge from the orifice 23 as a jet suitable for coating the bulb. Excess liquid drains from the bulb into the trough 7 and thence back to the tank 1. When the bulb is removed the nozzle 6 rises again under the action of the spring 21 and most of the liquid now flows through the orifices 24 and is deflected by deflector 25 into the trough 7, whence it is returned to the tank 1.

We claim:

Apparatus for coating the interior surface of hollow objects with a coating suspension comprising a chamber for holding the coating suspension, a nozzle having at least one continuously open main orifice, means for pumping coating suspension continuously from said chamber to and through said main orifice, means providing for return flow of excess coating suspension to said chamber from an object being coated by the coating suspension, said nozzle comprising a pair of telescopic sleeve members for controlling the flow of coating suspension from said main orifice in order to provide a flow therefrom suitable for coating an object when it is required, one of said nozzle sleeve members being formed with at least one bypass orifice therein to provide for flow therethrough of coating suspension from said nozzle to said chamber by said return flow means, said nozzle sleeve members being arranged in telescopic sleeve-valve relation for varying the opening of said bypass orifice in accordance with the relative telescopic position of said sleeve members, means resiliently biasing said nozzle sleeve members relatively telescopically toward an open bypass orifice position, and means engageable by an object to be coated for telescopically moving one of said nozzle sleeve members relative to the other toward closed bypass orifice position and thereby providing for increasing the flow of coating suspension from said continuously open main orifice.

References Cited in the file of this patent

UNITED STATES PATENTS

| | | |
|---|---|---|
| 925,126 | Moxham | June 15, 1909 |
| 1,384,760 | Hurst | July 19, 1921 |
| 1,850,481 | Telfer | Mar. 22, 1932 |
| 2,229,631 | Barker et al. | Jan. 28, 1941 |
| 2,763,575 | Bede | Sept. 18, 1956 |

FOREIGN PATENTS

| | | |
|---|---|---|
| 784,750 | France | July 23, 1935 |